(12) United States Patent
Eagleston et al.

(10) Patent No.: US 11,477,392 B2
(45) Date of Patent: Oct. 18, 2022

(54) DYNAMIC IMAGE PROCESSING BASED ON FREQUENCY OF CAMERA SHUTTER ACTIVATION

(71) Applicant: Apple Inc., Cupertino, CA (US)

(72) Inventors: Walker J. Eagleston, San Francisco, CA (US); Neil Gareth Crane, San Francisco, CA (US); Brandon J. Corey, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/351,766

(22) Filed: Jun. 18, 2021

(65) Prior Publication Data

US 2021/0400182 A1    Dec. 23, 2021

Related U.S. Application Data

(60) Provisional application No. 63/041,621, filed on Jun. 19, 2020.

(51) Int. Cl.
*H04N 5/235* (2006.01)
*H04N 5/232* (2006.01)
*G03B 9/08* (2021.01)

(52) U.S. Cl.
CPC ............. *H04N 5/2353* (2013.01); *G03B 9/08* (2013.01); *H04N 5/23229* (2013.01)

(58) Field of Classification Search
CPC ............. H04N 5/2353; H04N 5/23229; H04N 5/23245; H04N 5/2356; H04N 5/35581; G03B 9/08
See application file for complete search history.

(56) References Cited

U.S. PATENT DOCUMENTS

| | | | | |
|---|---|---|---|---|
| 5,634,162 A | * | 5/1997 | Suzuki | H04N 5/2251 348/E5.025 |
| 9,270,887 B2 | * | 2/2016 | Tokunaga | H04N 5/232939 |
| 2013/0208143 A1 | | 8/2013 | Chou | |

(Continued)

OTHER PUBLICATIONS https://www.mediacollege.com/video/camera/shutter-vs-fps.html (Jun. 2, 2022).*

*Primary Examiner* — Hung H Lam
(74) *Attorney, Agent, or Firm* — Blank Rome LLP

(57) ABSTRACT

This disclosure pertains to techniques for dynamically adapting image capturing techniques, e.g., based on shutter activation frequency, to improve camera responsiveness. One such technique is a method, comprising: receiving a first capture request; in response to receiving the first capture request, using a first capturing technique to capture a first set of images based on an image capture sequence, the image capture sequence comprising one or more images; generating a first image based on the captured first set of images; receiving a second capture request within a first time window from the first capture request, wherein a duration of the first time window is based, at least in part, on a length of time needed to capture the one or more images of the image capture sequence using the first capturing technique; in response to the received second capture request, using a second capturing technique to capture a second set of images, wherein the second capturing technique is different from the first capturing technique; and generating a second image based on the captured second set of images.

17 Claims, 6 Drawing Sheets

(56) References Cited

U.S. PATENT DOCUMENTS

2017/0150041 A1* 5/2017 Huang ............... H04N 5/23245
2019/0370948 A1    12/2019 Tico
2021/0084231 A1*  3/2021 Lee ..................... H04N 5/2257

* cited by examiner

DYNAMIC IMAGE PROCESSING BASED ON FREQUENCY OF CAMERA SHUTTER ACTIVATION

TECHNICAL FIELD

This disclosure relates generally to the field of digital image processing. More particularly, but not by way of limitation, it relates to techniques for dynamically adapting image processing techniques based on camera shutter activation frequency to improve camera responsiveness.

BACKGROUND

Fusing multiple images of the same captured scene is an effective way of increasing signal-to-noise ratio (SNR) in the resulting fused image. This is particularly important for small and/or thin form factor devices—such as mobile phones, tablets, laptops, wearables, etc.—for which the pixel size of the device's image sensor(s) is often quite small. The smaller pixel size means that there is comparatively less light captured per pixel (i.e., as compared to a full-sized, standalone camera having larger pixel sizes), resulting in more visible noise in captured images—especially in low-light situations.

In general, by fusing multiple images together, a better-quality resultant image may often be achieved than may be obtained from a single image capture. However, capturing multiple images necessarily takes a certain amount of time. Disregarding processing time, the minimum time required to capture multiple images is a function of the exposure times needed to capture each of the multiple images. A user may attempt to take multiple images by rapidly and repeatedly pressing (or otherwise activating) a shutter button of an imaging device, such as a physical button or a virtual shutter button on a user interface of the imaging device. Each shutter button press represents a user request to capture an image and, in certain cases, the user may be placing such image capture requests at a rate that exceeds a minimum time needed to capture the multiple images that the camera may take (e.g., to use in a subsequent fusion operation) in response to a single image capture request. That is, the user may be pressing the shutter button faster than the image capture device can capture the various exposures needed to generate an image. A simple solution to this issue may be to drop any capture requests that occur before the minimum time has elapsed. However, dropping capture requests during rapid shutter button activation by a user can result in a perceived decrease in the responsiveness of the camera. Thus, what is needed is a scheme to dynamically adapt image processing techniques based on a shutter activation frequency.

SUMMARY

Devices, methods, and non-transitory program storage devices are disclosed herein related to image acquisition. More specifically, when attempting to capture a particular scene, a user may attempt to take many images in succession, for example, by repeatedly and rapidly pressing or otherwise activating a shutter button, which may be on a user interface of a camera device. The camera device may include a memory, one or more image capture devices, a display, the aforementioned user interface, and one or more processors operatively coupled to the memory, wherein the one or more processors are configured to execute instructions. In certain cases, the user may be attempting to take images faster than the image capture device is able to capture such images, e.g., when using a first capturing technique. To help maintain perceived responsiveness to the shutter activation requests received from a user, it may be desirable for the device to switch to a second capturing technique (e.g., a capturing technique that takes less total time to complete), in order to accommodate the user's successive capture requests.

More particularly, a first capture request may be received, and, in response to the first capture request, a first image is generated, e.g., using a first capturing technique with an image capture sequence comprising one or more images. To improve image quality, the one or more images captured as a part of an image capture sequence may be fused together to generate an output image. The one or more images included in the image capture sequence may be determined based on several factors, such as the current conditions under which the image capture device is attempting to capture images, an imaging mode that the image capture device is set in, and/or the capabilities of the image sensor hardware or firmware. For example, the image capture sequence may indicate a number of images to be captured and/or the exposure times of those images. The specific number of images to be captured and their exposure times may be determined based on, for example, lighting conditions, image capture device motion, light sensitivity of the image capture device, whether the image capture device supports image stabilization, etc.

A second image capture request may then be received within a first time window from the first capture request, where a duration of the first time window is based, at least in part, on a length of time needed to capture the one or more images of the image capture sequence using the first capturing technique. In certain cases, a determination of whether a minimum number of images have been generated using the first capturing technique may be made prior to switching to the second capturing technique. If the minimum number has not been met, then another image may be generated using the first capturing technique. If there is no minimum number of images requirement, or if the minimum number of images have already been generated, then a second image may be generated using a second capturing technique, where the second capturing technique modifies the image capture sequence that is used to generate a fused image in response to a capture request from a user.

In certain cases, the second capturing technique may modify the image capture sequence used to generate a fused image in response to a capture request from a user by reducing a duration of time needed to capture each of the images in the image capture sequence. For example, the second capturing technique may modify the image capture sequence by not capturing one or more relatively longer exposure images that would otherwise be captured when using the first capturing technique. As another example, the second capturing technique may modify the image capture sequence by adjusting the exposure times of individual images of the image capture sequence, such as by decreasing the exposure times of some, or all, of the individual images, in the image capture sequence. In certain cases, after the second image capture request is received, a second time window is started, and a third image capture request may be received outside of this second time window. In such cases, it may be determined that a sufficient amount of time has passed since the previous image capture request that the device may safely return to again d using the first capturing technique in order to generate a third image in response to the third image capture request. In other cases, after the second image capture request is received, a third image capture request may be received within the second time window. In such cases, it may be determined that a sufficient amount of time has not passed since the previous image capture request and that the device may not safely return to using the first capturing technique again. Thus, the third image may be generated based on the second capturing technique. In certain cases, the second time window may have a longer duration than the first time window. In other words, a different minimum amount of time between capture requests may be required for a camera device to exit out of using the second capturing technique than is required for the camera device to enter into using the second capturing technique.

As mentioned above, various non-transitory program storage device embodiments are disclosed herein. Such program storage devices are readable by one or more processors. Instructions may be stored on the program storage devices for causing the one or more processors to: receive a first capture request; generate, in response to receiving the first capture request, a first image using a first capturing technique with an image capture sequence, the image capture sequence comprising one or more images; receive a second capture request within a first time window from the first capture request, wherein a duration of the first time window is based, at least in part, on a length of time needed to capture the one or more images of the image capture sequence using the first capturing technique; and generate, in response to the received second capture request, a second image using a second capturing technique, wherein the second capturing technique modifies the image capture sequence.

Various methods of performing image capture are also disclosed herein, in accordance with the program storage device embodiments enumerated above. Various programmable electronic devices are also disclosed herein, in accordance with the program storage device embodiments enumerated above. Such electronic devices may include one or more image capture devices, such as optical image sensors/camera units; a display; a user interface; one or more processors; and a memory coupled to the one or more processors. Instructions may be stored in the memory, the instructions causing the one or more processors to execute instructions in accordance with the various program storage device embodiments enumerated above.

DETAILED DESCRIPTION

Figure 1:
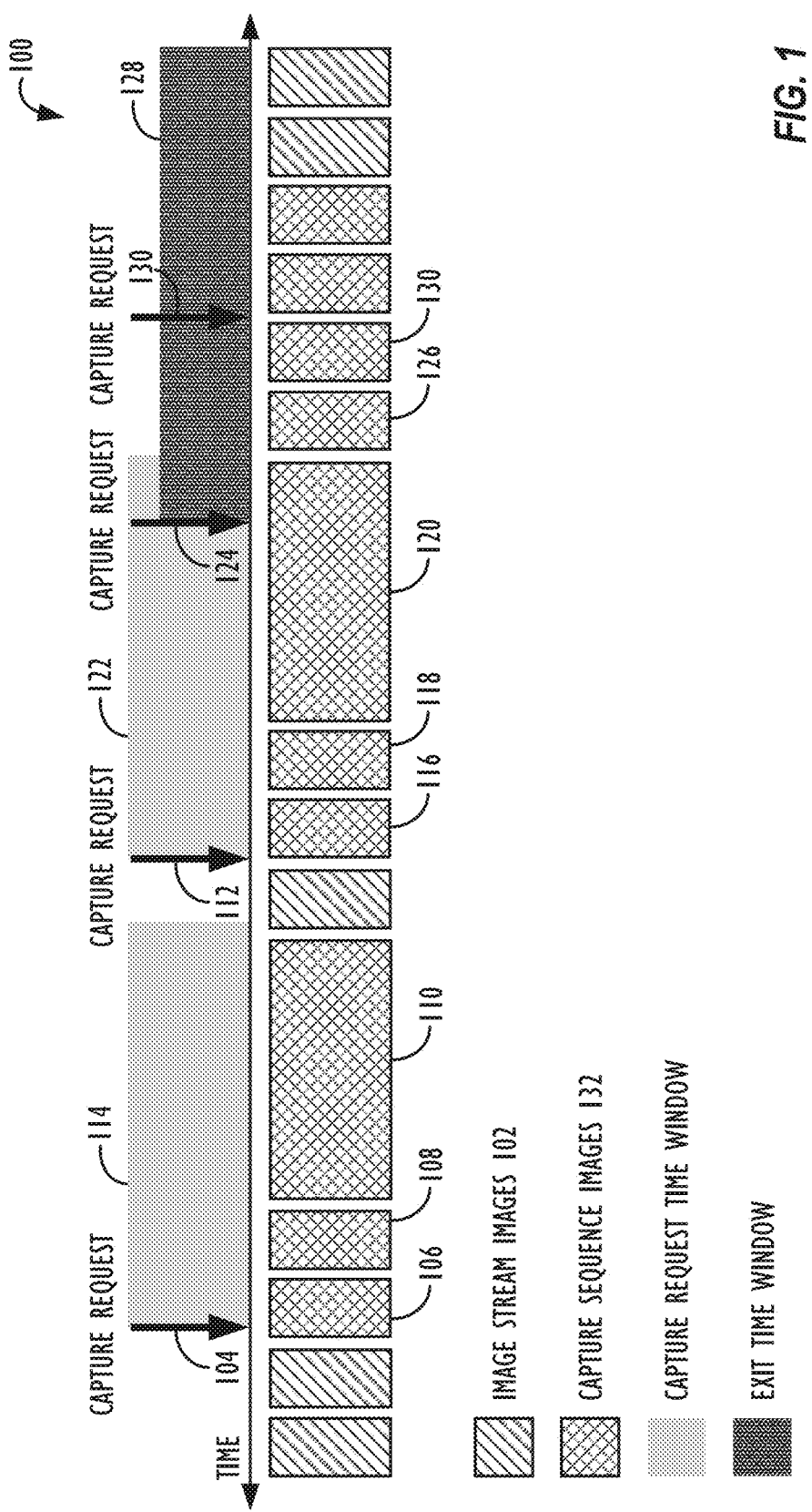
FIG. 1 is a timeline illustrating techniques for generating output images, in accordance with aspects of the present disclosure.

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes, and it may not have been selected to delineate or circumscribe the inventive subject matter, and, thus, resort to the claims may be necessary to determine such inventive subject matter. Reference in the specification to "one embodiment" or to "an embodiment" means that a particular feature, structure, or characteristic described in connection with the embodiments is included in at least one embodiment of one of the inventions, and multiple references to "one embodiment" or "an embodiment" should not be understood as necessarily all referring to the same embodiment.

In certain cases, an image capture device may continually capture images when activated. These continually captured images form an image stream, which may be used to generate a preview stream that may be displayed to a user on a display of an electronic device. Images from the image stream are generally discarded, if not otherwise used within a certain period of time. In certain cases, images from the image stream may be temporarily retained as capture sequence images, e.g., if the images are to be used to generate an output image in response to a received capture request from a user. In certain cases, individual images from the image stream may be selected as the output image to be returned and/or stored (e.g., for later processing) in response to a received capture request. In other cases, multiple images may be selected from the image stream for fusion as a part of generating an output image to be returned and/or stored in response to a received capture request.

Discussion will now turn to the nomenclature that will be used herein to refer to the various differently-exposed images from an incoming image stream. As in conventional bracket notation, "EV" stands for exposure value and refers to a given exposure level for an image (which may be controlled by one or more settings of a device, such as an image capture device's shutter speed, ISO, and/or aperture setting). Different images may be captured at different EVs, with a one EV difference (also known as a "stop") between images equating to a predefined power difference in exposure. Typically, a stop is used to denote a power of two difference between exposures. Thus, changing the exposure value can change an amount of light received for a given image, depending on whether the EV is increased or decreased. For example, one stop doubles (or halves) the amount of light received for a given image, depending on whether the EV is increased (or decreased), respectively.

The "EV0" image in a conventional bracket refers to an image that is captured using an exposure value as determined by an image capture device's exposure algorithm, e.g., as specified by an Auto Exposure (AE) mechanism. Generally, the EV0 image is assumed to have the ideal exposure value (EV) given the lighting conditions at hand.

It is to be understood that the use of the term "ideal" in the context of the EV0 image herein refers to an ideal exposure value, as calculated for a given image capture system. In other words, it is a system-relevant version of ideal exposure. Different image capture systems may have different versions of ideal exposure values for given lighting conditions and/or may utilize different constraints and analyses to determine exposure settings for the capture of an EV0 image.

The term "EV−" image refers to an underexposed image that is captured at a lower stop (e.g., 0.5, 1, 2, or 3 stops) than would be used to capture an EV0 image. For example, an "EV−1" image refers to an underexposed image that is captured at one stop below the exposure of the EV0 image, and "EV−2" image refers to an underexposed image that is captured at two stops below the exposure value of the EV0 image. The term "EV+" image refers to an overexposed image that is captured at a higher stop (e.g., 0.5, 1, 2, or 3) than the EV0 image. For example, an "EV+1" image refers to an overexposed image that is captured at one stop above the exposure of the EV0 image, and an "EV+2" image refers to an overexposed image that is captured at two stops above the exposure value of the EV0 image.

In some embodiments, certain overexposed or EV+ images may also be referred to herein as "long exposure images." Long exposure images may comprise images captured with greater than a minimum threshold exposure time, e.g., greater than 50 milliseconds (ms) and less than a maximum threshold exposure time, e.g., less than 250 ms, 500 ms, or even 1 second. In other embodiments, long exposure images may generally refer to images captured with a comparatively longer exposure time than a corresponding normal or "short" exposure image for the image capture device, e.g., an exposure time that is 4 to 30 times longer than a short exposure image's exposure time. In still other embodiments, the particular exposure time (and/or system gain) of a long exposure image may be further based, at least in part, on ambient light levels around the image capture device(s), with brighter ambient conditions allowing for comparatively shorter long exposure image exposure times, and with darker ambient conditions benefitting from the use of comparatively longer long exposure image exposure times. In still other embodiments, the particular exposure time (and/or system gain) of a long exposure image may be further based, at least in part, on whether the image capture device is using an OIS system during the capture operation.

According to some embodiments described herein, the incoming image stream captured by a camera device may comprise a combination of: EV−, EV0, EV+, and/or other longer exposure images. It is further noted that the image stream may also comprise a combination of arbitrary exposures, as desired by a given implementation or operating condition, e.g., EV+2, EV+4, EV−3 images, etc.

FIG. 1 is a timeline 100 illustrating techniques for generating output images, in accordance with aspects of the present disclosure. In certain cases, a device may be configured to capture images and generate an image stream comprising two or more images 102 when the device's camera mode is activated (e.g., during a live image preview stream capturing mode). Images from the image stream are referred to herein as "image stream images," and these images may be differently-exposed from one another and/or have exposure settings that change over time, e.g., based on capture conditions. In certain cases, each image 102 of the image stream may actually comprise two or more images captured based on the capture conditions and capture mode.

For example, in some instances, the images 102 in the image stream may actually reflect pairs of images captured by the image sensor with a predetermined exposure difference. For example, each pair of images may include an EV0 image and an EV− image (e.g., wherein the exposure of the EV− image in a given image pair is calculated relative to the EV0 image from that pair). As may be understood, the actual exposure settings upon which the capture of each pair of EV0 and EV− images are based may change from pair to pair, e.g., depending on the light conditions in the scene. For the purposes of illustration, each block 102 representing an "image stream images" in FIG. 1 may thus represent a single image capture, or may represent a captured pair (or any other predefined group) of images In the timeline of captured frames 100 of FIG. 1, the width of a captured image along the time axis generally represents the relative exposure time required to capture the respective image (i.e., wider blocks represent longer exposure times, although all images are not necessarily drawn to scale, based on their exposure times).

As mentioned above, in image fusion, one of the images to be fused is typically designated as the reference image for the fusion operation, to which the other candidate images involved in the fusion operation are registered. Reference images are often selected based on being temporally close to a capture request, i.e., the moment that the user wishes to "freeze" in a taken image. Thus, an image from the image stream temporally closest in time to a user's activation of a camera shutter button may be selected as the reference image. In other cases, an image from the image stream that has the least noise or the best motion freezing characteristics may be selected as the reference image, i.e., even if it is not temporally the closest image to the received image capture request. Images from the image stream may be captured using relatively short exposure times (e.g., an EV0 image, or other image with an exposure time shorter than a long exposure image) to help minimize the time between the moment the shutter is activated by the user and the capturing of the reference image. This relatively shorter exposure time may result in reduced image quality of the reference image. For example, the reference image may have an undesirable amount of noise. As such, reference images may benefit from being fused with one or more additional images, e.g., images captured with longer exposure times (and, thus, less noise), in order to improve the image quality of the resultant fused image.

According to some embodiments, relatively longer exposure times or long exposure images may comprise an image frame captured to be over-exposed relative to an EV0 exposure setting. In some instances, it may be a predetermined EV+ value (e.g., EV+1, EV+2, etc.). In other instances, the exposure settings for a given long exposure image may be calculated on-the-fly at capture time (e.g., within a predetermine range).

According to some embodiments, the incoming image stream may comprise a particular sequence and/or particular pattern of exposures. For example, the sequence of incoming images may be: EV0, EV−, EV0, EV−, and so forth (e.g., as in the example of image pairs, described above). In other embodiments, the stream of incoming images may comprise only EV0 EV0 images. In certain embodiments, while images in the image stream may be differently-exposed over time relative to each other, for clarity, in this example, the images of the image stream 102 (e.g., images labeled 106, 108, 116, 118, 126, and 130) are shown as having the same exposure times, while the images captured as part of an image capture sequence of images 132, e.g., in response to an explicit capture request received from a user (e.g., images labeled 110 and 120) have different (and, in this case, longer) exposure times than the image stream images 102.

In response to a received capture request, an output image may be generated based on an image capture sequence. The image capture sequence indicates what images to capture for fusing together into the output image, and the image capture sequence may be based at least on current capture conditions. Capture conditions refer to environmental conditions under which an output image may be captured, such as ambient lighting conditions, camera motion, detected motion in a scene, etc. Types of images to be captured may be defined for one or more images of the image capture sequence. For example, for a given capture condition, a first capturing technique generally targeted towards obtaining a higher quality output images may be used. This first capturing technique may include capturing multiple images and/or include one or more relatively longer exposure images. For example, the first capturing technique may utilize an image capture sequence for a first capture request 104 using an EV0 image 106, a second EV0 image 108, and a relatively longer exposure EV+ (i.e., long exposure) image 110 and fusing these images to generate an output image in response to first capture request 104. As used herein, the term relatively longer exposure refers to an exposure time which is longer than an exposure time of another image, such as an image captured using the EV0 exposure setting. Of note, the image capture sequence of EV0, EV0, and EV+ images discussed herein and illustrated in FIG.1 is merely representative, and other image capture sequences or patterns may be used in a given implementation, as desired. As an example of another image capture sequence, an image capture sequence may include one or more EV0 images, followed by one or more long exposure images. As used herein, the images fused to generate an output image may be referred to as capture sequence images 132.

As used herein, a "capture mode" refers to a high-level mode that a camera device may be set in by a user, such as a "portrait" image capture mode, a general still image photo capturing mode, a high dynamic range (HDR) image capture mode, a video capture mode, a "burst" mode, a "night" or low-light image capture mode, etc., which choice of capture mode may define, at least in part, which capturing techniques are used by the camera device for a given set of capture conditions. "Capturing technique," as used herein, refers to particular camera settings within a given capture mode, such as HDR, which changes how many (and which types of) images are captured For example, where the camera device is set to a particular capturing mode, such as a still image photo capturing mode, the camera device may be able to switch between a first capturing technique and a second capturing technique. As discussed above, the first capturing technique may be generally targeted toward obtaining a higher quality output image by fusing a set of images and/or including relatively longer exposure images. The second capturing technique may generally be intended to capture a set of images more quickly (which may come at the expense of quality in the output image, in some instances).

In many cases, successive capture requests may be received with sufficient time between them to allow the imaging device to capture the necessary constituent images and generate an output image in response to a first capture request before a second capture request is received. In certain cases, if a second capture request is received before the imaging device can complete the capture and generation of an output image for a previous capture request, the imaging device may switch to use the second capturing technique, in order to help the camera device better keep up with the incoming capture requests, thereby providing a more responsive user experience. To help determine whether to switch image capturing techniques (e.g., from a first capturing technique to a second capturing technique), the camera device may be configured to determine whether a second capture request is received within a window of time after a first capture request is received. For example, if a second capture request 112 is received after a first post capture request time window 114 ends, then a second output image may again be captured using the first capturing technique (i.e., having an image capture sequence determined based on the first capturing technique and the current capture conditions), e.g., including an EV0 image 116, EV0 image 118, and EV+ image 120, as shown in FIG. 1. For clarity, the examples provided here assume that the capture conditions are unchanged between capture requests (and thus, e.g., EV0 images 106, 108, 116, and 118 are shown as having the same block width, as are EV+ images 110 and 120), although it is to be understood that this may not be the case in a real-world capture scenario, wherein lighting conditions can change dramatically between capture requests. The post capture request time window 114 may have a duration of time that is defined based, at least in part, on the amount of time needed to capture the one or more images of the capture sequence based on the first capturing technique. In certain cases, the post capture request time window may be further based on an amount of time needed by the camera device to: prepare/reset capture buffers, cool down to stay within prescribed thermal limits, etc. In this example, the first post capture request time window 114 includes the time needed to capture: EV0 image 106, EV0 image 108, and EV+ image 110. Similarly, a second post capture request time window 122, associated with the second capture request 112 has a duration based on the time needed to capture EV0 image 116, EV0 image 118, and EV+ image 120. In certain cases, the post capture request time window 114 (and/or 122) may include additional time, i.e., in addition to the sum of exposure times needed to capture the one or more images of the image capture sequence. The amount of additional time may be predefined as either a fixed amount of time, or calculated based on a variety of factors relative to the images of the image capture sequence, including, but not limited to: processing time, a number of frames in an incoming image stream, updating capture conditions, etc. In certain cases, the fixed additional time may be, for example, as 125 ms, 250 ms, 333 ms, etc., after the last image of the image capture sequence is captured, or as a set amount of time after a particular image of the image capture sequence is captured.

In accordance with aspects of the present disclosure, if a subsequent capture request is received before a previous capture request's post capture request time window has ended, then the image capturing device may generate an output image for the subsequent capture request using a second capturing technique that is different from the first capturing technique. The second capturing technique may modify the image capture sequence that is captured in response to the subsequent capture request, e.g., to reduce the aggregate amount of time required to capture the images of the image capture sequence. In certain cases, if the image capture sequence includes capturing a relatively longer exposure images, i.e., as compared to the exposure times of other images of the image capture sequence, the longer exposure images may be shortened or omitted from the image capture sequence altogether when using the second capturing technique to generate an output image. As an example, if the first capturing technique includes an EV+ capture, the second capturing technique may omit the EV+ capture. In some instances, the second capturing technique may instead include an EV+ capture with a shorter exposure than an EV+ image captured according to the first capturing technique (e.g., the second capturing technique may capture an EV+1 instead of an EV+2). Additionally, or alternatively, the second capturing technique may shorten the exposure times of (or omit entirely) one or more of the EV0 or EV− captured using the first capturing technique, in order to help shorten the overall duration of time needed to capture the image capture sequence using the second capturing technique (e.g., an EV0 image capture present in the first capturing technique may instead be replaced by a corresponding EV− image capture in the second capturing technique, which EV− may or may not be a full stop underexposed from the corresponding EV0 image that would have been capturing using the first capturing technique). As a more specific example, if an image capture sequence includes an EV−, EV0,EV0, and EV+ images, the EV+ image may be skipped. Similarly, if an image capture sequence used with the first image capturing technique included an EV−, EV0, and EV0 images, one of the EV0 images may be skipped.

In certain cases, the post-processing of images captured using different capturing techniques may vary to help account for the different types of constituent images captured according to a respective capturing technique. For example, certain image post-processing techniques may be used to help compensate for a reduced overall exposure time used to capture the constituent images of a particular image capturing technique (e.g., the aforementioned second capturing technique). For example, stronger noise cancellation, sharpening, highlight recovery, contrast adjustments, etc. may be applied to images generating using the second capturing technique.

As a more specific example of the second capturing technique, a third capture request 124 is received before the second post capture request time window 122 ends. An image capture sequence determined using the first capturing technique for the third capture request 124 may be modified, for example, by omitting the long exposure image from the image capture sequence used by the first capturing technique. In this example, the modified image capture sequence used by a second capturing technique includes only EV0 image 126 and EV0 image 130. In certain cases, as the third capture request 124 was received during the capture of EV+ image 120, the capture of images in response to the third capture request 124 may be delayed until after the previous image capture sequence (i.e., the images captured in response to the second capture request 112) completes. In certain cases, if sufficient buffer memory is available, one or more images may be included in the respective sets of capture sequence images captured in response to two different capture requests (e.g., the second capture request 112 and the third capture request 124), and, thus, these images may be used in the generation of different output images. Images that can be reused as a part of multiple image capture sequences may be EV0, EV−, and/or EV+ images. Using the same constituent image in the generation of more than one output image may be particularly useful in instances where a given capturing technique uses multiple EV0 images, e.g., instead of a single, longer EV+ image in the generation of an output image as such reused images may be temporally closer to the time the image capture request was received. In other cases, if a subsequent capture request is received before the image capture sequence for a previous capture request is completed, the subsequent capture request may be queued for capturing once the image capture sequence of the previous capture request is completed.

In certain cases, e.g., when generating images using the second capturing technique, a so-called "exit time window" 128 may be started after a capture request triggers the use of the second capturing technique, such as is the case with the third capture request 124, illustrated in FIG. 1. An exit time window defines a time period associated with the second capturing technique, wherein subsequent capture requests are either captured using the same second capturing technique (i.e., if they fall within the exit time window of the previous capture request) or with a different capturing technique (i.e., if they occur after the exit time window of the previous capture request). The different capturing technique may, e.g., be a return to using the first capturing technique, or may comprise using yet another technique (e.g., a third capturing technique that may be used for some duration of time, before returning to the first capturing technique).

Returning to the example illustrated in FIG. 1, additional capture requests, such as a fourth capture request 130, received during this exit time window 128, may continue to be performed using the second capturing technique. The exit time window 128 may be at least as long as the time needed to perform the modified image capture sequence of the second capturing technique, for example, the time needed to capture the EV0 image 126 and EV0 EV0 image 130. In certain cases, the exit time window 128 may be longer than the post capture request time window, such as post capture request time windows 114 and 122 in FIG. 1. By making the exit time window 128 longer than the post capture request time window, once use of the second capturing technique is started, continued use of the second capturing technique is more likely, as the required rate at which capture requests must be received from the user in order to enter the second capturing technique is higher than the rate below which the capture requests must drop in order for the camera device to exit out of using the second capturing technique (e.g., in order to return to use of the first capturing techniques). In certain cases, the exit time window 128 may have a predetermined and/or fixed time duration. In certain cases, each additional capture request received during an exit time window may start another exit time window. For example, exit time window 128 may be started after the third capture request 124, and another new exit time window may be started based on the time at which the fourth capture request 130 was received. In certain cases, if another capture request is received after the exit time window 128 ends, use of the second capturing technique may be stopped and use of the first capturing technique may be resumed.

Figure 2:
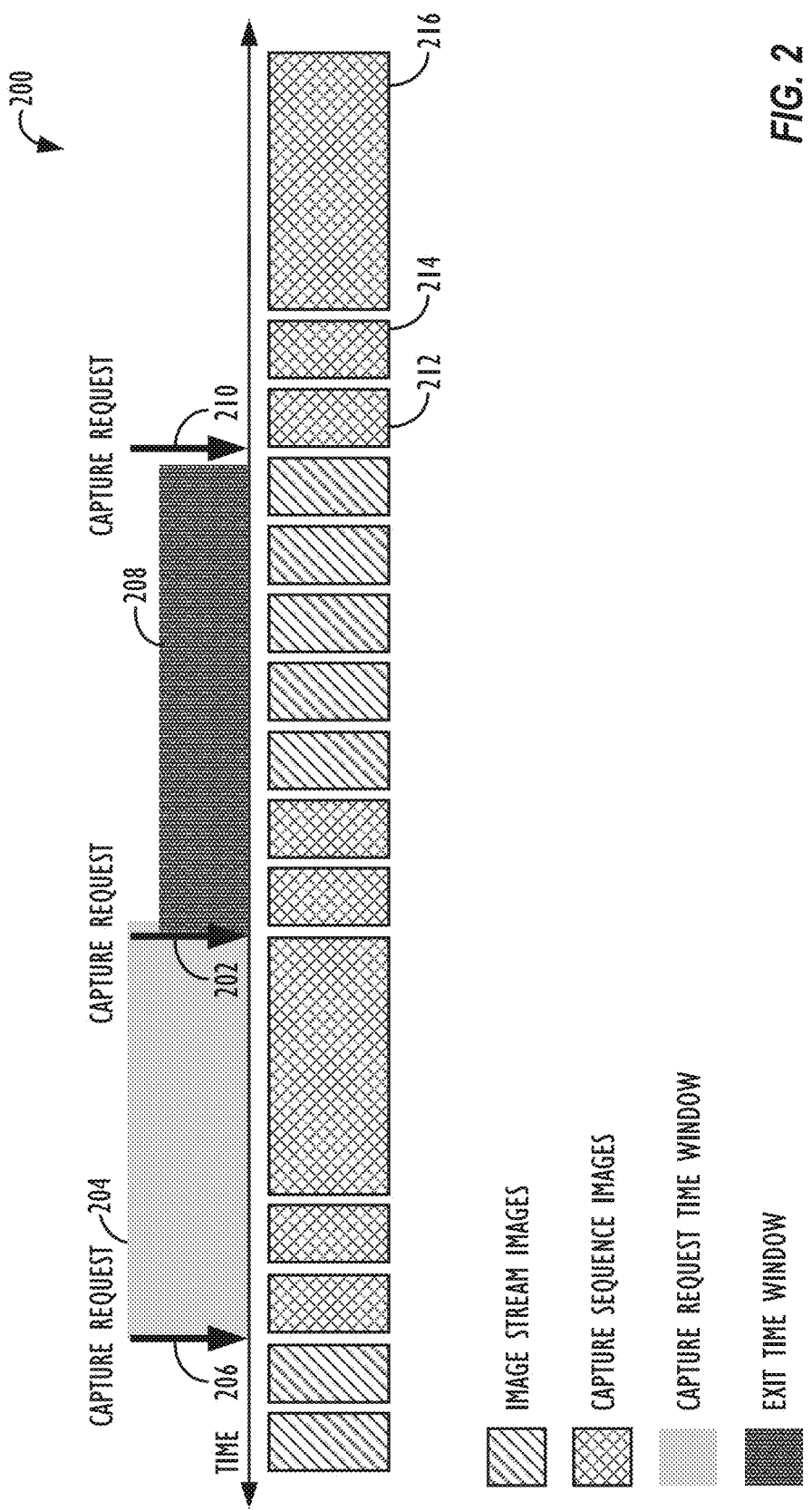
FIG. 2 is a timeline illustrating the use of first and second image capturing techniques to generate output images in response to received capture requests, in accordance with aspects of the present disclosure.

FIG. 2 is a timeline 200 illustrating a technique for using first and second capturing techniques to generate output images in response to received capture requests, in accordance with aspects of the present disclosure. In this example, a second capture request 202 is received within a post capture request time window 204 after a first capture request 206, and an output image is generated based on a modified capture sequence of a second capturing technique. After receiving the second capture request 202, an exit time window 208 may be started. If another capture request, such as a third capture request 210, is received after the exit time window 208 ends, an output image response to the third capture request 210 may again be generated based on the first capturing technique, i.e., using the image capture sequence for the first capturing technique, here including a EV0 EV0 image 212, EV0 EV0 image 214, and EV+ image 216.

In certain cases, other factors may cause the image capture device to stop generating images using the second capturing technique (and/or to use other alternative capturing techniques beyond just the first and second capturing techniques). In some camera devices, certain capturing modes may be incompatible with the second capture mode. For example, in a so-called "burst mode," a camera device may capture multiple images at a fixed capture rate in response to a user activating a shutter button using a single explicit activation command, such as by holding down the shutter button, swiping, or other such UI element or action. In such cases, the fixed capture rate may comprise a system-enforced capture rate (e.g., based on the processing and/or optical capabilities of the camera device and/or the current capture conditions). As such burst mode capture modes may be entered into via a single explicit user activation command and employ a fixed image capture rate, there is no need for the camera device to adjust exposure times of individual captured images and/or monitor when subsequent capture requests are received relative to the capture time windows of previously-captured images, i.e., in order to maintain responsiveness to additional capture requests (as discussed with regard to the various FIG. 1 and FIG. 2 embodiments described above, wherein determinations are made by the camera device when to switch between using first and second capturing techniques). Thus, as may now be understood, in certain capture modes, such as the aforementioned burst mode, entry to the second capturing technique may be disabled. The second capturing techniques may also be disabled, e.g., due to other factors, including, but not limited to: storage space availability, camera device temperature, image capture device temperatures, etc.

In certain cases, a change in camera capture mode or capture conditions, such as changing light levels, may impact the use of the second capturing technique. For example, if light levels in the scene that is being captured fall below a predetermined level, the camera device may switch to a different capture mode (this may be done by a user opting to change the camera device, e.g., into a "low light mode," or it may be done automatically by the camera device). In some cases, the changing of capturing technique from the first capturing technique to the second capturing technique within a given capture mode based on the frequency of capture requests received may be disabled. In other instances, the capturing technique may still change, but may be changed between different capturing techniques than those used during higher light level capture modes. In still other instances, the image capturing device may stop using the second capturing technique if the camera device is placed into another capture mode that is incompatible with second capture mode. As a more specific example, if scene light levels fall below a certain threshold value, the camera device may enter a "night mode" or "low light mode." As longer exposure times may be a mandatory part of such night or low light modes, the camera device may temporarily disable the use of a second capturing technique that requires the omission of a long exposure image.

In certain cases, the camera device may transition to using second capturing techniques based on capture conditions, device conditions, or other environmental factors. For example, if a camera device is near its thermal limits, the additional processing power needed to capture and perform fusion operations using one or more longer exposure images may cause the camera device to more quickly exceed its thermal limits. In such cases, the camera device may transition to using second capturing techniques to help reduce processing requirements and mitigate the thermal impact from such processing, i.e., regardless of the frequency of shutter activations received from a user.

Figure 3:
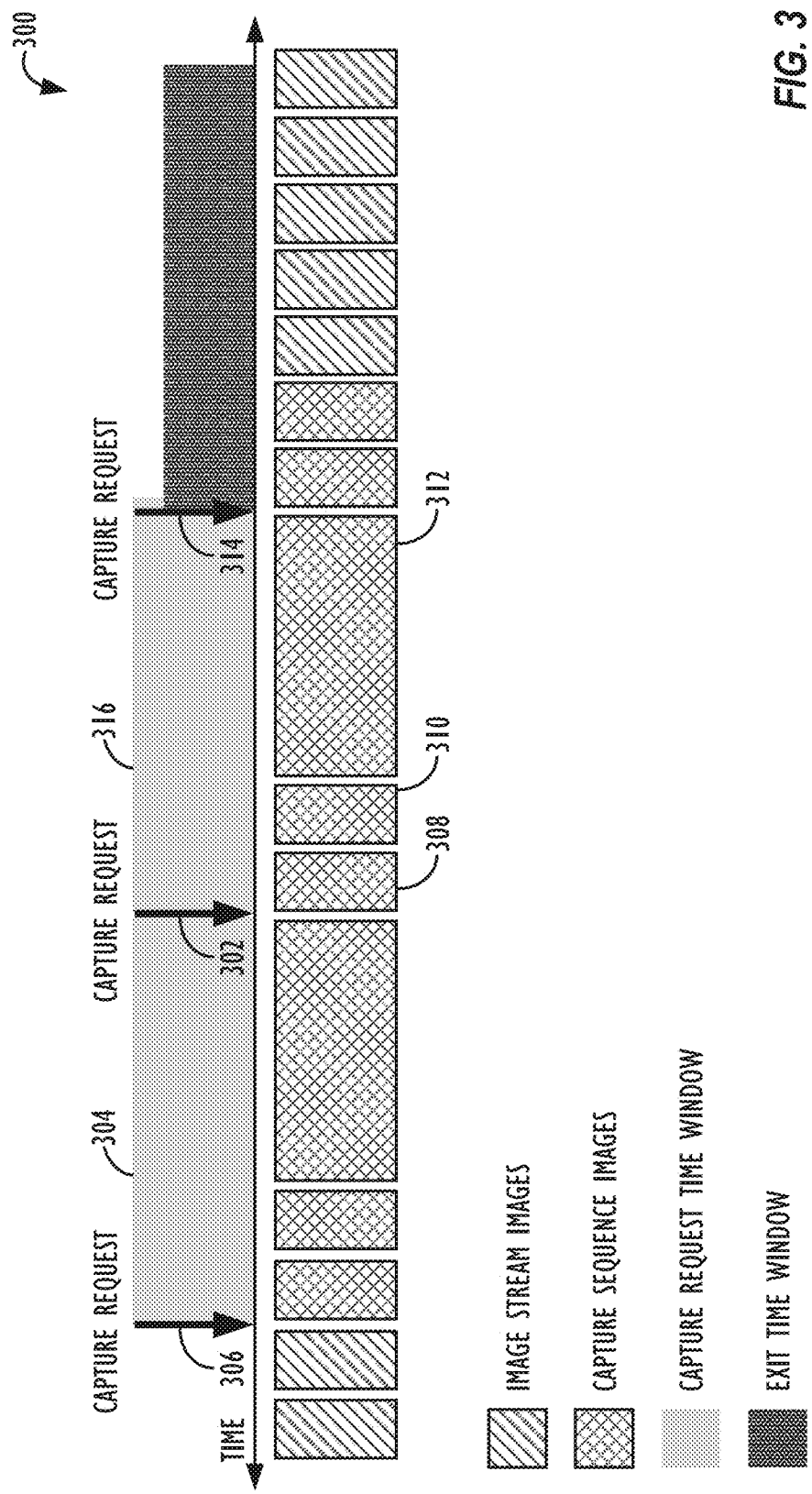
FIG. 3 is a timeline illustrating a forced use of a first image capturing technique to generate an output image, in accordance with aspects of the present disclosure.

FIG. 3 is a timeline 300 illustrating a "forced" use of a first image capturing technique to generate an output image, in accordance with aspects of the present disclosure. For example, FIG. 3 illustrates a timeline 300 during which one or more images are "forced" (e.g., by software instructions executing on the camera device) to be captured using a first capturing technique—even though a particular capture request has been received within the post capture request time window from a previous request (i.e., at a time that would typically trigger the camera device to switch to using a second capturing technique, e.g., as explained above in reference to FIGS. 1 and 2).

As illustrated in FIG. 3, in some cases, in order to help maintain a level of quality of output images and avoid potential accidental initiations of secondary capturing techniques, in certain cases, a minimum number of output images may be generated via a first (i.e., regular) capturing technique before beginning to a use a second capturing technique (i.e., a technique which may typically be employed in response to rapid shutter activation by a user, in order to maintain perceived responsiveness to the user). For example, when multiple sequential capture requests are received within the post capture request time window, a minimum number, such as two, output images may be generated using the first capturing technique (e.g., the camera's default or regular capturing technique) before beginning to use the second capturing technique to generate output images. As an example, in FIG. 3, a second capture request 302 is received within a first post capture request time window 304 after a first capture request 306. In this example, a system-enforced rule is in place, requiring a minimum number of two output images to be generated using the first capturing technique before the camera device will switch over to generating output images using the second capturing technique—regardless of the frequency of the received capture requests. Thus, while the second capture request 302 is received within the first post capture request time window 304, an output image is still generated using the first capturing technique, which, in this example, includes a EV0 EV0 image 308, as well as a longer exposure EV0 EV0 image 310, and an additional EV+ image 312. After a third capture request 314 is received within a second post capture request time window 316, because the minimum required number of two images have now been generated using the first capturing technique, the camera device may now being to use the second capturing technique to generate the next output image, i.e., in response to the third capture request 314. As illustrated in FIG. 3, switching over to the use of the second capturing technique is reflected in the fact that there is no longer exposure EV+ image (such as image 312, described above, as being captured in response to capture request 302) that is captured in response to capture request 314.

Figure 4:
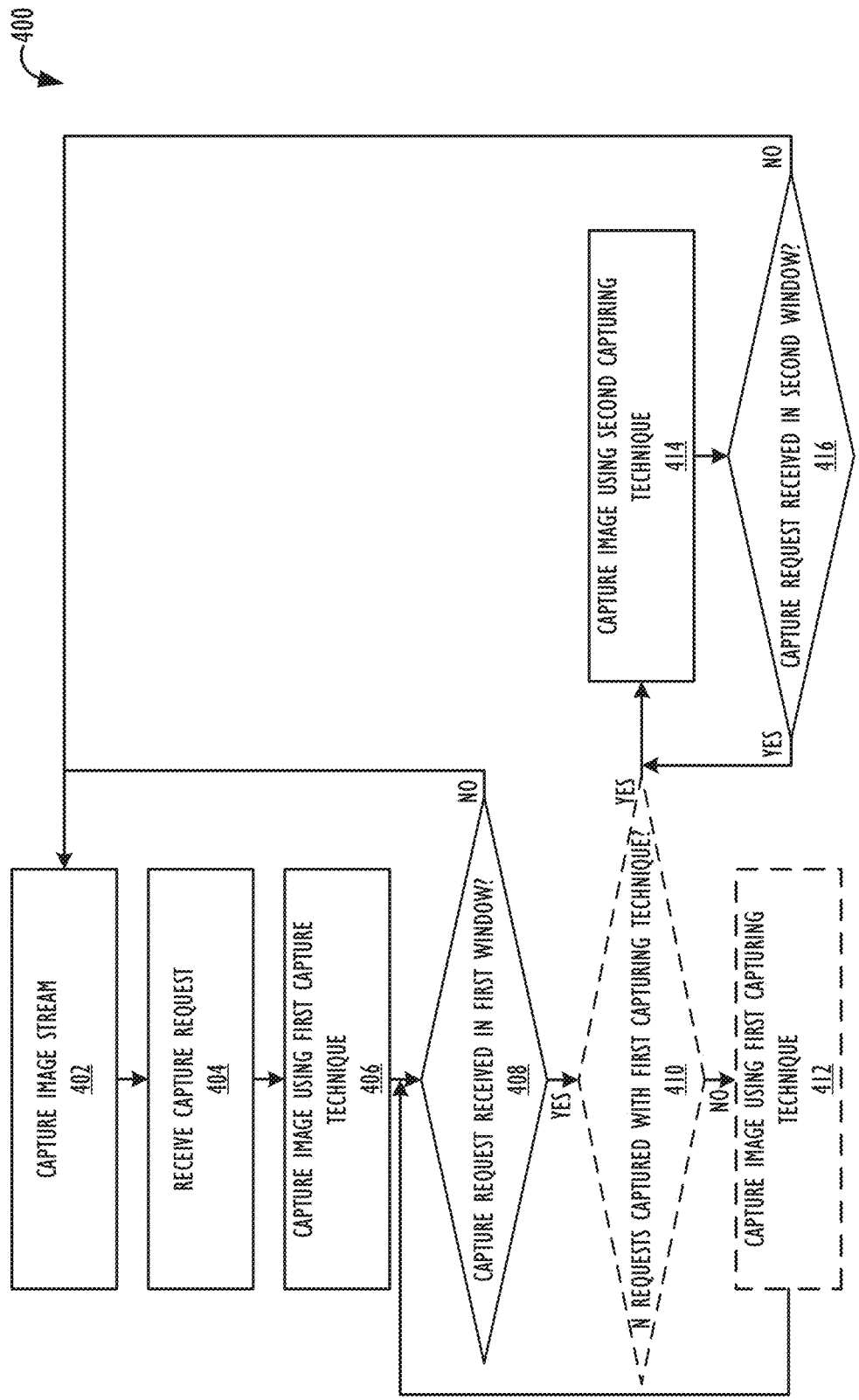
FIG. 4 is a flowchart illustrating transitions between first and second image capturing techniques, in accordance with aspects of the present disclosure.

FIG. 4 is a flowchart 400 illustrating transitions between first and second capturing techniques, in accordance with aspects of the present disclosure. In certain cases, when an image capture mode of a camera device is activated, the camera device may begin to capture a stream of images at block 402. At block 404, a capture request is received. As an example, the camera device may receive a user-initiated request to capture an image, such as the user as activating a physical (or virtual) shutter button. At block 406, a set of one more images are captured using a first capturing technique. For example, the camera device may capture the set of one or more images using a first capturing technique, which may be designed to generate an output image of a high quality level. A first time window, such as a post capture request time window, is started after the image capture request is received. If there are no additional capture requests received within the first time window, at block 408, then the image capture device may resume capturing the image stream at block 402. In certain cases, e.g., if capture requests are being received faster than the camera device is able to capture the constituent images needed to fulfill such capture requests, then such capture requests may be queued and then handled, e.g., in a first in-first out (FIFO) order, as the camera device again becomes capable of fulfilling the incoming image capture requests.

Optionally, at block 410, if there have not been a minimum number, N, of capture requests that have been captured using the first capturing technique, then images are captured using the first capturing technique at block 412 to generate an output image for the capture request. If there has been a minimum number of capture requests captured using the first capturing technique at block 410, then images are captured using a second capturing technique at block 414. If the camera device is not configured with optional blocks 410 and 412, execution proceeds to block 414, and images are captured using a second capturing technique. For example, the image capture device may capture images with a second capturing technique using a modified image capture sequence and generate an output image. A second time window, such as an exit time window, may be started after an image capture request is received for capture using the second capturing technique. At block 416, if another capture request is received within the second time window, another image may be generated using the second capturing technique. If no additional capture requests are received within the second time window, then image stream images may continue to be captured, with execution returning to block 402.

Figure 5:
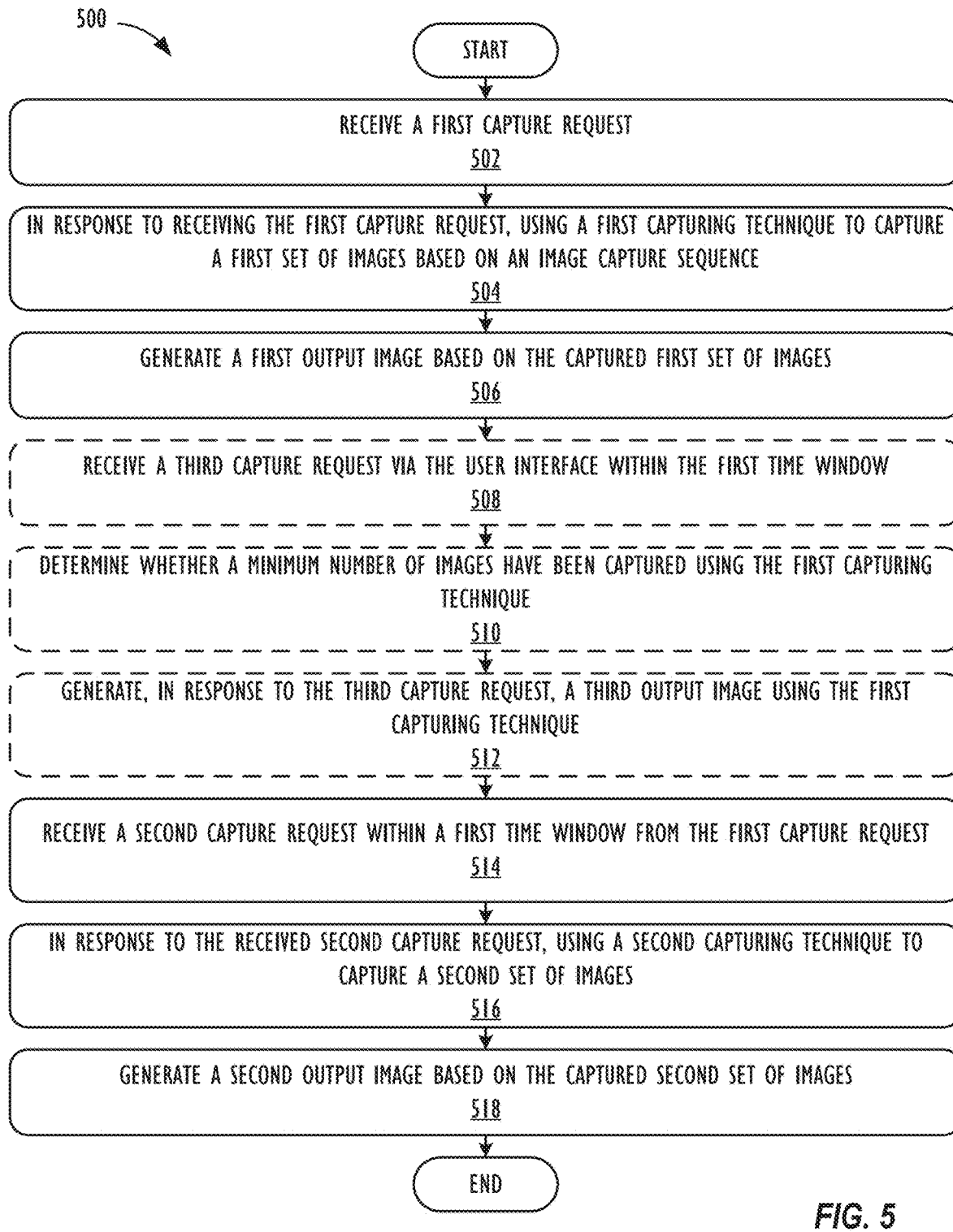
FIG. 5 is a flowchart illustrating the second image capturing technique, in accordance with aspects of the present disclosure.

FIG. 5 is a flowchart illustrating a second image capturing technique 500, in accordance with aspects of the present disclosure. At block 502, a first capture request is received. For example, a user may activate a physical (or virtual) shutter button, e.g., via a user interface of a camera device, to request that an image be captured. At block 504, in response to the received capture request, using a first capturing technique to capture a first set of images based on an image capture sequence, the image capturing sequence comprising one or more images. For example, if operating in a still image photo capture mode, the camera device may capture one or more images for fusion to generate an output image. A post capture time window may be started after the image capture request is received. At block 506, a first output image is generated, based on the captured first set of images. For example, captured images may be fused into an output image. Optionally, at block 508, a third capture request may be received within a first time window (e.g., the first time window from the prior capture request, such as the first capture request). In certain cases, at block 510, a determination is made whether a minimum number of images have been captured using the first capturing technique, and, at block 512, a third output image may be generated, in response to the third capture request, using the first capturing technique. For example, the camera device may be configured such that, when multiple capture requests are received within one or more post capture time windows, at least a required minimum number of output images are generated using the first capturing technique before switching to capturing images using the second capturing technique. At block 514, a second capture request is received within the first time window from the prior capture request (e.g., the first capture request). At block 516, in response to the received second capture request, using a second capturing technique to capture a second set of images. As described in the various embodiments above, the second capturing technique may be different from the first capturing technique, e.g., in some cases, the second capturing technique modifies the particular image capture sequence that is used for the first capturing technique. For example, when using the second capturing technique, the image capture sequence for the current capture conditions may be modified to reduce an overall duration of time needed to capture the image capture sequence. In a more specific example, the exposure times for individual ones of the images captured as a part of the image capture sequence using the second capturing techniques may be reduced, or one or more relatively longer exposure images of the image capture sequence may simply be omitted. At block 516, a second image is generated, based on the captured second set of images. For example, images captured using the second capturing technique in response to the second capture request may be fused into an output image. As discussed above, the second capturing technique may continue to be used by the camera device until sufficient criteria have been met for the camera device to stop using the second capturing technique. For example, a second time window may begin after receipt of the second capture request. If a third capture request is received outside of the second time window, the camera device may return to using the first capturing technique, and a third image, responsive to the third capture request, may be generated using the first capturing technique. In certain cases, a duration of the second time window may be longer than the duration of the first time window. If, instead, the third capture request is received within the second time window, then the third image, responsive to this third capture request, may be generated using the second capturing technique again.

Exemplary Hardware and Software

Figure 6:
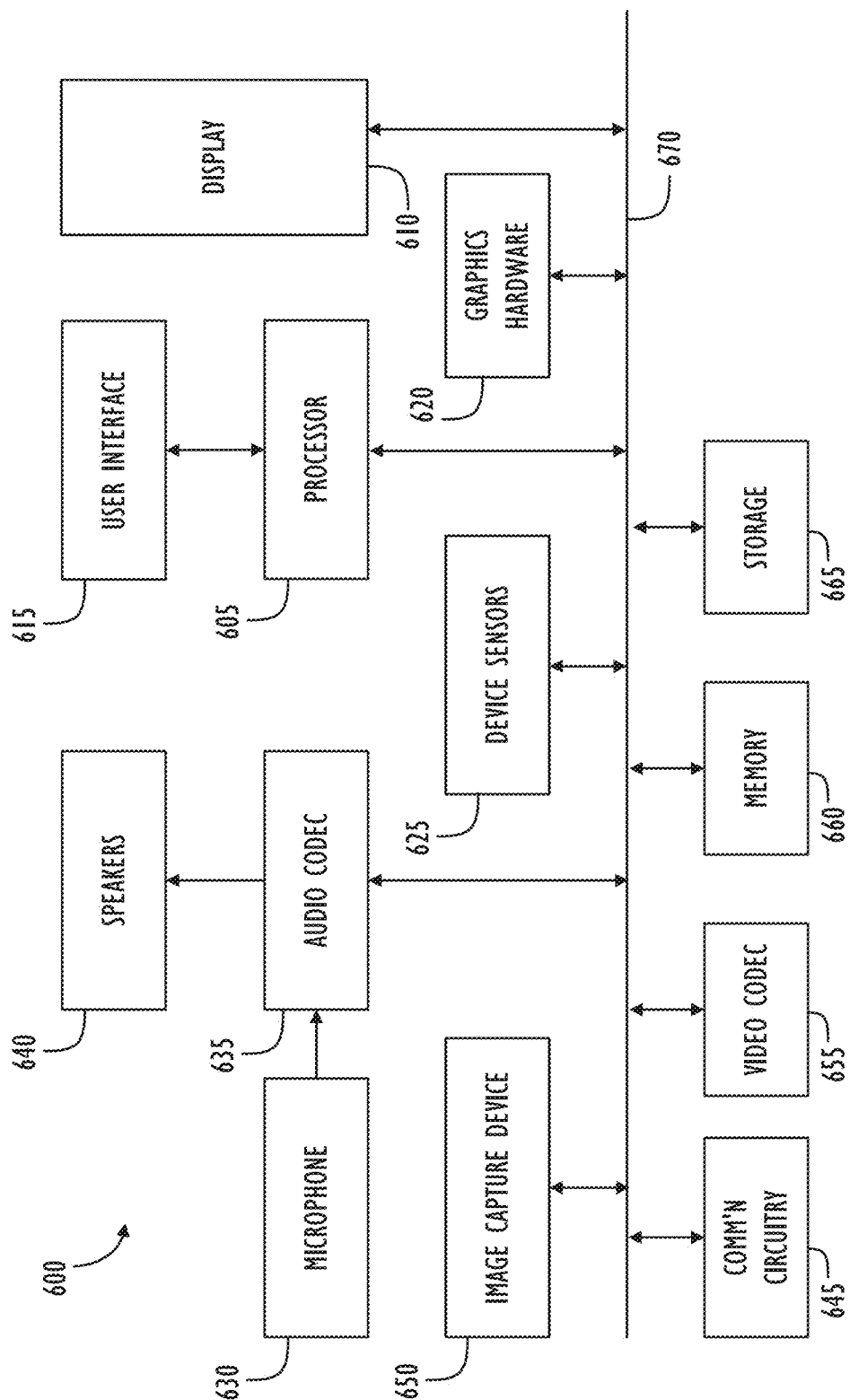
FIG. 6 is a functional block diagram of a programmable electronic device, according to one embodiment.

Referring now to FIG. 6, a simplified functional block diagram of illustrative programmable electronic device 600 is shown according to one embodiment. Electronic device 600 could be, for example, a mobile telephone, personal media device, portable camera, or a tablet, notebook or desktop computer system. As shown, electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, imaging device 650, which may, e.g., comprise multiple camera units/optical image sensors having different characteristics or abilities (e.g., High Dynamic Range (HDR), Optical Image Stabilization (OIS) systems, optical zoom, digital zoom, etc.), video codec(s) 655, memory 660, storage 665, and communications bus 670.

Processor 605 may execute instructions necessary to carry out or control the operation of many functions performed by electronic device 600 (e.g., such as selecting images from a sequence of images for use in a fusion operation, in accordance with the various embodiments described herein). Processor 605 may, for instance, drive display 610 and receive user input from user interface 615. User interface 615 can take a variety of forms, such as a button, keypad, dial, a click wheel, keyboard, display screen and/or a touch screen. User interface 615 could, for example, be the conduit through which a user may view a captured video stream and/or indicate particular image(s) that the user would like to capture (e.g., by clicking on a physical or virtual button at the moment the desired image is being displayed on the device's display screen). The user interface may also encompass any predefined interaction with the device. For example, an indication that the user would like to capture an image could be received as an audio input, gesture or facial expression captured by a camera or other sensor on the device, or wireless signals received from an external device (e.g., a smartwatch that can act as a remote trigger). In one embodiment, display 610 may display a video stream as it is captured while processor 605 and/or graphics hardware 620 and/or imaging circuitry contemporaneously generate and store the video stream in memory 660 and/or storage 665. Processor 605 may be a system-on-chip such as those found in mobile devices and include one or more dedicated graphics processing units (GPUs). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 perform computational tasks. In one embodiment, graphics hardware 620 may include one or more programmable graphics processing units (GPUs).

Imaging device 650 may comprise one or more camera units configured to capture images, e.g., images which may be processed to generate depth/disparity information for such captured images, e.g., in accordance with this disclosure. Output from imaging device 650 may be processed, at least in part, by video codec(s) 655 and/or processor 605 and/or graphics hardware 620, and/or a dedicated image processing unit or image signal processor incorporated within imaging device 650. Images so captured may be stored in memory 660 and/or storage 665. Memory 660 may include one or more different types of media used by processor 605, graphics hardware 620, and imaging device 650 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to retain computer program instructions or code organized into one or more modules and written in any desired computer programming language. When executed by, for example, processor 605, such computer program code may implement one or more of the methods or processes described herein.

It is to be understood that the above description is intended to be illustrative, and not restrictive. For example, a sequence of images can be obtained from a variety of imaging devices which include, but are not limited to still imaging devices, video devices, non-visible light imaging devices, etc. It can be understood that various techniques may be used to detect and locate objects, determine trajectories for objects, and score the determined trajectories. Determining and aggregating trajectory scores may also be tuned to address specific scenarios.

Many other embodiments will be apparent to those of skill in the art upon reviewing the above description. The scope of the invention therefore should be determined with reference to the appended claims, along with the full scope of equivalents to which such claims are entitled.

What is claimed is:

1. A device, comprising:
   a memory;
   one or more image capture devices;
   a display; and
   one or more processors operatively coupled to the memory, wherein the one or more processors are configured to execute instructions causing the one or more processors to:
   receive a first capture request;
   in response to receiving the first capture request, use a first capturing technique to capture a first set of images based on an image capture sequence, the image capture sequence comprising one or more images;
   generate a first output image based on the captured first set of images for output;
   receive a second capture request within a first time window from the first capture request, wherein a duration of the first time window is based, at least in part, on a length of time to capture the one or more images of the image capture sequence using the first capturing technique;
   in response to the received second capture request, use a second capturing technique to capture a second set of images, wherein the second capturing technique is different from the first capturing technique, and wherein the second capturing technique modifies the image capture sequence by adjusting exposure times of images of the image capture sequence; and
   generate a second output image based on the captured second set of images for output.

2. The device of claim 1, wherein the second capturing technique modifies the image capture sequence to reduce the length of time to capture the one or more images of the image capture sequence.

3. The device of claim 2, wherein the second capturing technique modifies the image capture sequence by not capturing a relatively longer exposure image that would be captured with the first capturing technique.

4. The device of claim 1, wherein the first time window includes an additional amount of time in addition to a sum of exposure times of the one or more images of the image capture sequence.

5. The device of claim 1, wherein the one or more processors are further configured to execute instructions causing the one or more processors to:
   receive a third capture request within the first time window;
   in response to receiving the third capture request, determine whether a minimum number of images have been generated using the first capturing technique;
   generate a third output image using the first capturing technique based on a determination that the minimum number of images have not been generated; and
   generate the third output image using the second capturing technique based on a determination that the minimum number of images have been generated.

6. The device of claim 1, wherein the one or more processors are further configured to execute instructions causing the one or more processors to:

receive a third image capture request outside of a second time window, the second time window beginning after the receiving of the second capture request; and generate a third output image based on the first capturing technique.

7. A non-transitory program storage device comprising instructions stored thereon to cause one or more processors to:

receive a first capture request;

in response to receiving the first capture request, use a first capturing technique to capture a first set of images based on an image capture sequence, the image capture sequence comprising one or more images; generate a first output image based on the captured first set of images;

receive a second capture request within a first time window from the first capture request, wherein a duration of the first time window is based, at least in part, on a length of time to capture the one or more images of the image capture sequence using the first capturing technique;

in response to the received second capture request, use a second capturing technique to capture a second set of images, wherein the second capturing technique is different from the first capturing technique, wherein the second capturing technique modifies the image capture sequence by adjusting exposure times of images of the image capture sequence; and generate a second output image based on the captured second set of images.

8. The non-transitory program storage device of claim 7, wherein the second capturing technique modifies the image capture sequence to reduce the length of time to capture the one or more images of the image capture sequence.

9. The non-transitory program storage device of claim 8, wherein the second capturing technique modifies the image capture sequence by not capturing a relatively longer exposure image that would be captured with the first capturing technique.

10. The non-transitory program storage device of claim 7, wherein the instructions are further configured to cause the one or more processors to:

receive a third capture request within the first time window;

in response to receiving the third capture request, determine whether a minimum number of images have been generated using the first capturing technique;

generate a third output image using the first capturing technique based on a determination that the minimum number of images have not been generated; and generate the third output image using the second capturing technique based on a determination that the minimum number of images have been generated.

11. The non-transitory program storage device of claim 7, wherein the instructions are further configured to cause the one or more processors to:

receive a third image capture request outside of a second time window, the second time window beginning after the receiving of the second capture request; and generate a third output image based on the first capturing technique.

12. A method for obtaining an image, the method comprising:

receiving a first capture request;

in response to receiving the first capture request, using a first capturing technique to capture a first set of images based on an image capture sequence, the image capture sequence comprising one or more images; generating a first output image based on the captured first set of images;

receiving a second capture request within a first time window from the first capture request, wherein a duration of the first time window is based, at least in part, on a length of time to capture the one or more images of the image capture sequence using the first capturing technique;

in response to the received second capture request, using a second capturing technique to capture a second set of images, wherein the second capturing technique is different from the first capturing technique, wherein the second capturing technique modifies the image capture sequence by adjusting exposure times of images of the image capture sequence; and generating a second output image based on the captured second set of images.

13. The method of claim 12, wherein the second capturing technique modifies the image capture sequence to reduce the length of time to capture the one or more images of the image capture sequence.

14. The method of claim 13, wherein the second capturing technique modifies the image capture sequence by not capturing a relatively longer exposure image that would be captured with the first capturing technique.

15. The method of claim 12, wherein the first time window includes an additional amount of time in addition to a sum of exposure times of the one or more images of the image capture sequence.

16. The method of claim 12, further comprising:

receiving a third capture request within the first time window; in response to receiving the third capture request, determining whether a minimum number of output images have been generated using the first capturing technique;

generating a third output image using the first capturing technique based on a determination that the minimum number of images have not been generated; and generating the third output image using the second capturing technique based on a determination that the minimum number of images have been generated.

17. The method of claim 12, further comprising:

receiving a third image capture request outside of a second time window, the second time window beginning after the receiving of the second capture request; and generating a third output image based on the first capturing technique.

* * * * *